produce the animation for the transparency. This eliminates the need for the separate analyzer which must be employed with the light intercepting sheet 26.

Although the preferred embodiment of the invention employs an embossed light intercepting sheet, it also is possible to practice the invention in its broadest sense by employing a light intercepting sheet which is not embossed. For example, a transparent sheet of material can have a pattern of opaque lines printed or drawn thereon corresponding to any one or a combination of the patterns illustrated in FIGS. 14–40, or a pattern of lines corresponding with the pattern for the internal combustion engine of FIG. 41. Such a printed transparent sheet can be positioned behind a transparency or other type of sheet having the art work thereon to be animated, and a transparent disc having parallel opaque lines with a line thickness and spacing substantially corresponding to the thickness and spacing of the lines on the printed transparent sheet can be employed in place of the rotary polarizer. With this arrangement the disc preferably should closely overlie the transparent sheet with the pattern of motion lines closely and when the disc is rotated, the art work will be animated. About 50 or more opaque lines per inch are preferably employed, and when a large number of lines per inch are used, such as 500 lines per inch, for example, moire fringes are produced when the lined disc is rotated. The movement of these fringes across the art work on the transparency similar to the shadows produced by the preferred embodiment employing the embossed light interceptor sheet and creates the illusion of animation. Of course, in this arrangement no stress lines are formed in the light intercepting sheet and no molecular orientation or re-orientation takes place as in the preferred embodiment having the embossed lines. The disc having the parallel opaque lines thereon is the equivalent of the polarizer, but no counterpart of the analyzer need be employed in this printed arrangement.

Where the term imprinted is used in the claims it is intended to broadly include both the preferred embossed light intercepting sheets and the printed sheets wherein the pattern of light intercepting motion lines is printed on the surface of a sheet of isotropic material without embossing the surface to in effect give it a birefringent character. Also, where the term polarize is used in the claims in combination with an "imprinted" light intercepting sheet, it is intended to include a disc having the opaque lines thereon as well as the polarizing material used in the preferred embodiment as the polarizer.

It is apparent that the photoengraved plate for embossing the light intercepting sheet 48 of FIG. 41 also could be covered with a suitable ink and employed to print the light intercepting pattern of motion lines for the engine 60, for example, without employing the heat and pressure required for embossing. Of course, it will be appreciated that the embossing or imprinting plate referred to above and in the claims does not have to be a flat plate, since cylinders and the like can be used for embossing or printing the motion lines on light intercepting sheets by a rolling operation, for example.

The term "imprinted" and "embossed" motion lines are used in the claims to define motion lines formed by pressure of a master die or plate on a surface of a light intercepting sheet so that the motion lines are a mirror image of the lines on the master die or plate.

What is claimed is:

1. In combination, a source of light; a rotatable polarizer; a layer of light transmitting material having a plurality of light intercepting patterns of motion lines embossed on different areas of a continuous uninterrupted surface of said layer, the pattern of motion lines on at least two of said areas producing different motions; and an analyzer, said layer of light transmitting material being positioned in the path of light from said source passing between said polarizer and analyzer.

2. A light-intercepting sheet for an animated display device comprising a layer of light transmitting material having oriented molecules and a predetermined pattern of motion lines embossed in one face thereof, the direction of orientation of said molecules being determined by the direction of said lines, said lines extending in a plurality of different directions so that said molecules are oriented in a plurality of different directions, whereby said light intercepting sheet can co-operate with a rotary polarizer and an analyzer to produce changing light and dark areas on said pattern depending on the angular position of said rotary polarizer relative to the direction of said lines.

3. The invention as defined in claim 2 wherein said light transmitting material is substantially isotropic.

4. The invention as defined in claim 3 wherein said molecules are oriented substantially perpendicular to said embossed lines.

5. The invention as defined in claim 2 wherein at least some of said lines are curved lines.

6. The invention as defined in claim 2 wherein said pattern of motion lines comprises closely spaced parallel lines with groups of said parallel lines being disposed at different angles relative to other groups of said parallel lines.

7. The invention as defined in claim 2 wherein said pattern of motion lines comprises a plurality of closely spaced radial lines.

8. The invention as defined in claim 5 wherein said pattern of motion lines comprises a plurality of pie-shaped sectors each having a common center and a plurality of concentric arcuate lines thereon, the center of curvature of the arcuate lines of each sector being spaced from said common center and located substantially on a line extending radially from the center through the sector.

9. The invention as defined in claim 5 wherein said pattern of motion lines comprises a plurality of closely spaced generally sinusoidal lines.

10. The invention as defined in claim 2, including in combination, a rotatable polarizer, and an analyzer, said light intercepting sheet being positioned in the path of light passing between said polarizer and analyzer.

11. The invention as defined in claim 10 wherein said layer comprises substantially isotropic material.

12. The invention as defined in claim 2 wherein said layer is a sheet of plastic material having an oriented polyvinyl alcohol laminate on one face thereof, said light-intercepting pattern of motion lines being embossed on areas of the other face thereof, the areas on said one face overlying said areas on said other face being covered with a polarizing ink.

13. The invention as defined in claim 12 wherein a picture is painted on said one face of said sheets with the areas thereof to be animated overlying the inked areas on said one face.

14. The invention as defined in claim 10 including a sheet having the picture to be animated painted thereon and positioned to be illuminated by said light after it passes through said rotatable polarizer and light intercepting sheet, the portion of said picture to be animated overlying said pattern of motion lines.

15. The invention as defined in claim 14 wherein said light-intercepting pattern of motion lines comprises closely spaced curved lines.

16. The invention as defined in claim 14 wherein said pattern of motion lines is embossed on different areas of said surface with the pattern on at least two of said areas being different from one another so as to produce different types of motions.

17. The invention as defined in claim 14 wherein said light-intercepting pattern of motion lines is embossed on a plurality of areas of said layer, the pattern of motion lines on at least two of said areas differing from one another so as to produce different motions.

18. The invention as defined in claim 17 wherein at least one of said patterns comprises closely spaced curved lines.

3,437,402
ARYL THIOETHER IMMERSION LIQUIDS
Philip L. Levins, Lexington, Mass., assignor, by mesne assignments, to Bausch & Lomb Incorporated, Rochester, N.Y.
Filed Feb. 23, 1966, Ser. No. 529,374
Int. Cl. G02b 3/12
U.S. Cl. 350—179                                  4 Claims

ABSTRACT OF THE DISCLOSURE

An immersion liquid interposed between and contacting both the objective lens and the specimen under examination, said immersion liquid comprising an aryl thioether having at least three benzene rings and a high refractive index.

---

This invention relates to optical systems employing an immersion liquid disposed between an objective lens and a specimen being optically examined. In particular, the invention provides aryl thioethers such as poly(phenyl sulfides) having high indices of refraction and employed as optical element in the system. The invention also comprises a novel aryl thioether compound, 2,3'-bis(phenylthio)diphenyl sulfide, which is a thioether having four benzene rings linked by three sulfur atoms. This compound is particularly useful because of its high index of refraction and stability.

Immersion liquids have been used in optical systems for improving resolving power of high magnification microscopes such as those used in metallographs. It is desirable in such applications to match the index of the lens material employed in the microscope objective lens to the immersion material.

Numerous high-index liquids have been employed by prior workers in the field, most of which have numerous disadvantages when used in an optical system. Desirable properties of high index immersion liquids include the following: (1) for ease of handling, a liquid material should have low vapor pressure at ambient temperature, (2) the immersion liquid should have stability with respect to the change in the index of refraction and stability of color, (3) the ideal immersion liquid should be unobnoxious and essentially odorless and non-poisonous, and (4) the liquid should be chemically inert to the objective lens material and to most metals and inorganic crystals or other specimen materials.

Commonly used immersion liquids at the present time include methylene iodide, $CH_2I_2$ which has a high index of refraction ($n_D=1.74$), but is relatively volatile. Other pure liquids include phenyldi-iodoarsine, $C_6H_5AsI_2$ ($n_D=1.85$), and selenium monobromide, $Se_2Br_2$ $$(n_D=2.1)$$

The reactivity and instability of these compounds make them generally undesirable for use as immersion liquids. Numerous materials such as aniline, $\alpha$-bromonaphthalene, methylene iodide and water have been used as solvents for other materials in producing immersion liquids; but most solutes, such as antimony tribromide, arsenic bromide, sulfur, selenium, phosphorous, and various sulfides, are obnoxious, poisonous, reactive and frequently have high vapor pressures.

For use in crystal studies and non-opaque applications the use of various oils as immersion liquids have been known for many years. Cedarwood oil ($n_D=1.5$) was among the first to be used as an immersion liquid. An early lens system for an immersion objective using incident light for an object is described by Ramsthaler in Zeits. Wiss. Mik., vol. 51, 179–183 (1934). More sophisticated microscopes such as those shown by Bond in U.S. Patent 3,202,049 have integral liquid dispensers for applying immersion liquid to the area between the microscope objective lens and a specimen, such as a microscope slide. The immersion liquids described herein are suitable for use in existing metallograph instruments such as those described by Foster and Benford in U.S. Patent 2,074,106, 2,660,923 and 3,035,486. in practice, the objective lens is maintained a few thousandths of an inch from the specimen surface and the immersion liquid is inserted between the objective lens, which is usually a plano surface, and the specimen.

It has been discovered that a group of aryl thioethers are suitable for use as immersion liquids. In particular those thioethers having three or more benzene rings, substituted or unsubstituted, display a high index of refraction of the order of 1.6 to 1.7 and higher and are stable optically and chemically. The thioethers have low chemical reactivity, are essentially unobnoxious and non-odorous, and have very low vapor pressures at ambient temperatures. In addition, these immersion liquids are relatively viscous oils which are easily applied to the optical surfaces of microscope systems and which are essentially clear. One novel compound, 2,3'-bis(phenylthio) diphenyl sulfide, is especially suitable for use as an immersion liquid because of its high index of refraction ($n_D=1.704$). This compound and the other poly(phenyl sulfides) disclosed herein may be produced by known methods, such as the reaction of alkali metal salts of mercaptans and aryl halides by heating the components in a suitable solvent, such as liquid ammonia or various tertiary amines and amides. Particularly high yields and purities may be obtained by the process described by Uhlenbroek in Recueil, vol. 80, pages 1057–1065 (1961) and also described by Campbell et al. in U.S. Patent 3,119,877. These authors provide a method for producing aryl thioethers using such solvents as dimethylformamide and dimethylacetamide by heating alkali metal salts of aryl mercaptans with halo-substituted aromatic compounds.

Accordingly it is an object of this invention to provide an optical system in which an immersion liquid comprising an aryl thioether having at least three benzene rings is interposed between an objective lens and a specimen. In particular, it is an object of this invention to provide immersion liquids having high indices of refraction; and it is a further object of this invention to provide a novel compound, 2,3'-bis(phenylthio)diphenyl sulfide, for use in the above described optical system. These and other objects and features of the invention will be apparent from the following description and drawing wherein a single figure shows a vertical cross section of the optical system employing an immersion liquid.

Referring to the drawing, the figure shows a specimen 1, such as a polished metal object to be examined optically. An objective lens 2 having a plano surface facing specimen 1 is positioned adjacent the object surface, and a small quantity of aryl thioether immersion liquid 3 is interposed between the objective lens 2 and specimen 1. The use of a high refractive index liquid in this optical system increases the amount of illumination received by the objective lens of a microscope. The aryl thioether liquid wets the specimen surface and the objective lens, and completely fills the area between.

Due to the low vapor pressure of these compounds, essentially no liquid is lost by evaporation at ambient temperatures. The viscous property of the aryl thioethers having three or more benzene rings aids in holding the immersion liquid in place during use.

The use of lower molecular weight ethers containing a phenyl group has not proven successful for optical immersion systems. Anisole (phenyl methyl ether,

was reported by Lentze in J. Royal Microscopical Soc., vol. 50, page 88 (1933), as an immersion liquid ($n_D$=1.5103); however the compound darkened easily and its thinness was a disadvantage.

Phenyl sulfide (diphenyl sulfide, $(C_6H_5)_2S$) has been reported by Meyrowitz in his compilation of immersion media in the American Mineralogist, vol. 40, No. 5 and 6, pp. 398–409 (1955) as an immersion liquid ($n_D$=ca. 1.63)

but there appears to be considerable problems in determining the exact index of refraction and stability is a problem.

It has been discovered that those aryl thioethers having at least three benzene rings will display sufficient steric compactness of phenyl groups to increase the refractive index sufficiently to enable their use in an optical system as a successful immersion liquid.

These aryl thioethers generally have an index of greater than 1.6; and one particular compound 2,3'-bis(phenylthio)diphenyl sulfide has been found having an index in excess of 1.7. The general stability, inertness and physical properties of these compounds make them highly desirable as immersion media. The poly(phenyl thioethers) having four benzene rings joined by at least one ortho or meta linkage are preferred. It is believed that para linkages at such high molecular weights cause a tendency to form solid compounds.

One example of a suitable aryl thioether is m-bis(phenylthio)benzene,

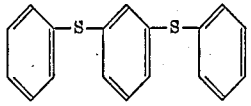

a colorless oil having a boiling point of 174–181° C. at 0.3 mm. Hg pressure and an index of refraction, $n_D^{25°}$ of 1.6742.

Those poly(phenylthioethers) having at least four substituted or unsubstituted benzene rings and having the structure,

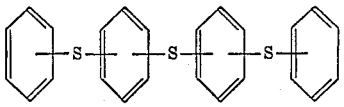

where at least one ortho or meta linkage is present are preferred because of their low vapor pressure, high viscosity, high refractive index and stability.

The preferred compound for this invention is a novel composition, 2,3'-bis(phenylthio)diphenyl sulfide, having the structure,

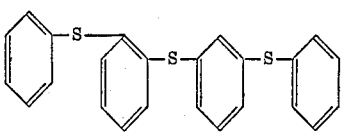

This novel compound is essentially a colorless, odorless liquid which is thermally and oxidatively stable and has a low vapor pressure at ambient temperature. The preferred compound has one ortho and one meta linkage between its four benzene rings. An isomer of this compound having two meta linkages is known. However, the di-meta isomer, bis(m-phenylthio)diphenyl sulfide, is a colorless solid having a melting point of 53–55° C. Consequently, the known isomer is not suitable for use as an immersion liquid at ambient temperaturt.

The aryl thioethers used in this invention may be made by reacting alkali metal salts of aryl mercaptans and aryl halides at elevated temperatures. Several solvents are described for the reaction components by Uhlenbroek and Campbell et al. These include pyridine, quinoline, triethanolamine, liquid ammonia, dimethylformamide (DMF) and dimethylacetamide (DMA). While no particular process is necessary in the preparation of the poly(phenyl sulfides), heating the reactants in the last two solvents is preferred.

Substituting in the poly(phenyl sulfides) by radicals may be desirable. Iodo- and bromo- substituted compounds are known for their use as immersion liquids, and various alkyl, carboxyl, organo-metallic, azo, oxy and other substituents may be used advantageously.

EXAMPLE 2,3'-bis(phenylthio)diphenyl sulfide is prepared in two steps using the reaction of the potassium salt of o-bromothiophenol with m-dibromobenzene to produce an intermediate compound, 2,3'-dibromophenyl sulfide. The intermediate aryl bromide is reacted with potassium thiophenolate to produce the desired product, according to the following synthesis:

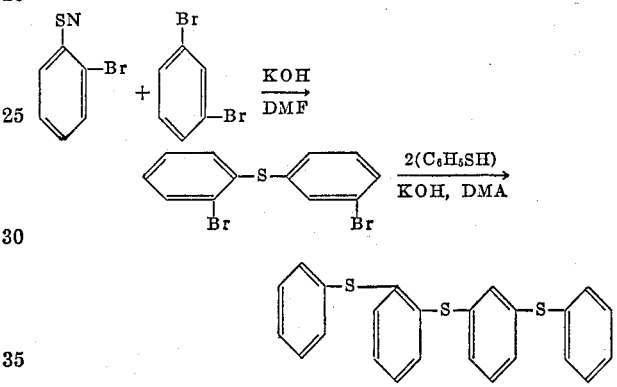

Preparation of o-bromothiophenol
(By the method of Saggiomo, et al., J. Org. Chem., 23, 1908 (1958))

An aqueous solution of sodium nitrite (80.5 g./200 ml.) was added to a mixture of 200 g. (1.16 mole) of o-bromoaniline in 205 ml. of conc. hydrochloric acid and 730 ml. of water maintained at 0° C. This solution of diazotized aniline was added over one hour, below the liquid surface, to a solution of 321 g. (2 moles) of potassium ethyl xanthate in 585 ml. of water maintained at 70° C. Moderate sputtering was observed. Temperature was maintained for an additional hour. The mixture was then cooled and the non-aqueous phase was washed with dilute (5%) potassium hydroxide and water. The thiophenol was isolated by adding the oil portionwise to a solution of 365 g. of potassium hydroxide in 268 ml. of water and 820 ml. of ethanol and allowed to reflux for 20 hours. The mixture was cooled, poured onto ice, acidified with conc. hydrochloric acid, and the oil extracted with chloroform and water, and dried over a desiccant. Distillation of the oil at 5.5 mm. gave 131 g. of product boiling at 90–92°.

Preparation of 2,3'-dibromodiphenyl sulfide

A mixture of 100 g. (0.53 mole) of o-bromothiophenol, 35 g. (0.62 mole) of potassium hydroxide, and 300 ml. of dimethylformamide (DMF) was heated to reflux (145°) to remove water, cooled, and 160 g. (0.68 mole) of m-dibromobenzene was added. The solution was refluxed for several hours. The solution was cooled and treated with 265 ml. of 12.5% aqueous sodium hydroxide. The organic phase was separated, washed with water and dried over $CaCl_2$. The solvent was stripped off and the product vacuum distilled, giving a low boiling fraction of unreacted m-dibromobenzene and 98 g. of 2,3'-dibromodiphenyl sulfide, having a boiling point of 145–150° C. at 0.3 mm. Hg. The fraction solidified to white crystals on standing.

Preparation of 2,3'-bis(phenylthio)diphenyl sulfide

A mixture of 69.5 g. (0.63 mole) of thiophenol, 41 g.

(0.63) mole of potassium hydroxide, and 200 ml. of dimethylacetamide (DMA) was heated to 160° to drive off water and cooled to 20°, whereupon 90 g. (0.26 mole) of 2,3′-dibromodiphenyl sulfide was added and the mixture was refluxed at 165° for 22 hours. The mixture was cooled, added to 250 ml. of 12.5% aqueous sodium hydroxide, water, and dried over calcium chloride. After stripping off the benzene, the oil was vacuum distilled at 0.5 mm., giving 7 g. of unreacted dibromide (B.P. 122°) and 88 g. of product, B.P. 255–260°. The small amount of dibromide contaminating the product was filtered off using a medium frit glass funnel. The index of refraction of the filtered product was $n_D^{25} = 1.7046$.

A small fraction of the product was further purified by washing the product in ether solution with dilute sodium hydroxide and water and then filtering. Redistillation gave a fraction boiling at 247–250° at 0.3 mm. Hg which was filtered to yield an oil which had a very pale yellow color.

The product immersion oil is interposed between an objective lens and a specimen as shown in the drawing, and the optical system provided by such immersion objective arrangements may be used in a metallograph microscope or other suitable high-power optical applications.

While the invention has been described with reference to specific compounds and elements, there is no interest to limit the inventive concepts.

What is claimed is:
1. In an optical system in which an immersion liquid is interposed between and contacting both an objective lens and a specimen, the improvement which comprises employing an immersion liquid comprising an aryl thiother having at least three benzene rings linked by sulphur atoms and having a high refractive index.

2. The optical system of claim 1 wherein the aryl thioether has the structure

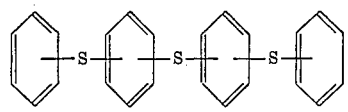

in which structure at least one ortho and meta linkage is present.

3. The optical system of claim 1 wherein the aryl thioether has the structure

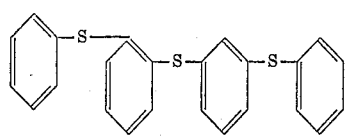

4. The optical system of claim 1 wherein the aryl thioether has at least four substituted benzene rings, having at least one ortho and meta linkage.

References Cited

UNITED STATES PATENTS 2,700,918  2/1955  Osterberg et al. ____ 350—180 X
3,321,529  5/1967  Campbell.

JOHN K. CORBIN, *Primary Examiner.*

U.S. Cl. X.R.

260—609